Oct. 9, 1962 A. HEIBER 3,057,470

PHONOGRAPH RECORD FOLDER

Filed July 14, 1960

INVENTOR
ARNOLD HEIBER

ATTY.

United States Patent Office 3,057,470

Patented Oct. 9, 1962

3,057,470
PHONOGRAPH RECORD FOLDER old Heiber, 6436 Orange St., Los Angeles 48, Calif.

Filed July 14, 1960, Ser. No. 42,881
7 Claims. (Cl. 206—62)

This invention relates to a new and improved phonograph record folder.

The principal object of my invention is to provide an improved "pop-out" type record folder designed to facilitate taking records out and replacing them by holding the records vertically when the folder is opened to spread its base and is resting securely on this broad base on a flat surface, the upper half of the record in the process of unfolding the sides of the folder to form the base being exposed for easy grasping by finger tips engaging the edges at diametrically opposed points, so that there is no danger of records being damaged by scratching and by blotting with finger prints, many high-priced records being ruined every day by reason of damage done in the removal and replacement thereof with the old unimproved record holders, because the slightest scratch or finger print is amplified with modern high fidelity systems, making the old fashioned holders obsolete, no longer satisfactory.

In the record folder of my invention, the envelope containing the record or records is made in two telescoping sections, the lower one of which provides support for the record or records in a vertical plane when the folder is opened and the upper section has been slid downwardly out of the way, the upper section being hingedly connected at its upper end with the upper part of each of the outwardly unfoldable side members of the folder, the lower part of the two sides being hingedly connected with the upper part and with the lower section of the envelope, whereby to provide good support for the record or records when the folder is opened, the folder being nevertheless just as compact as the old-style holders when closed, so that it can be housed nicely in a protective envelope, such as is usually provided with the old-style holders, and the protective envelope serving in this instance the additional function of preventing unfolding of the folder so long as it remains in the envelope.

The invention is illustrated in the accompanying drawing, in which—

Similar reference numerals are applied to corresponding parts throughout the views.

Figures 1, 2, 3, 4, 5, 6, 7:
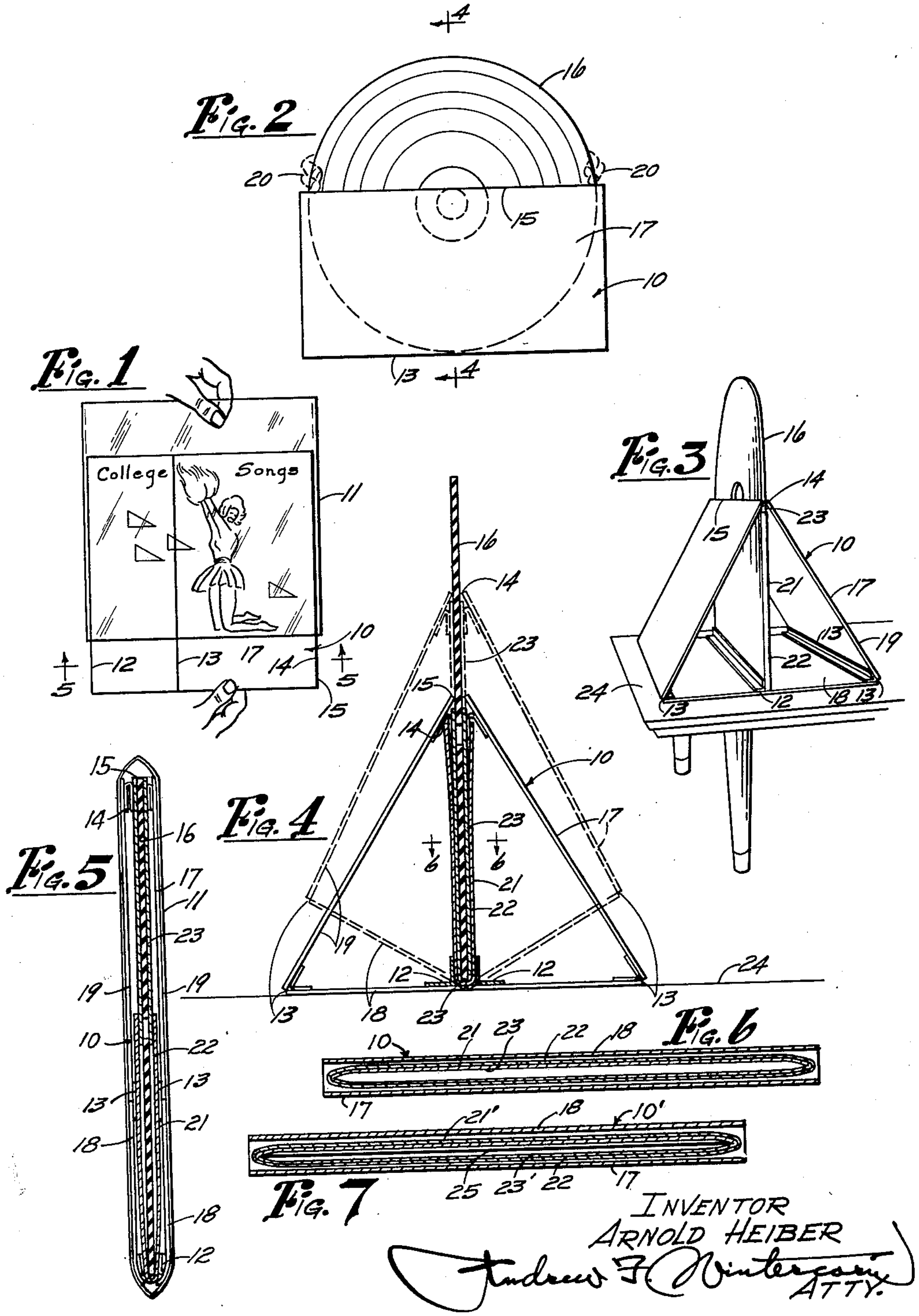
FIG. 1 is a face view of a record folder made in accordance with my invention, shown being slipped out of its protective transparent plastic envelope, the folder being inserted so that the hinges between the sections of the side members extend parallel to the direction of insertion, for best results.
FIG. 2 is a side view of the folder when opened, illustrating in dotted lines how the record or records may be removed by finger tip contact on the diametrically opposed edges of the exposed upper half.
FIG. 3 is a perspective view of FIG. 2.
FIG. 4 is a vertical section on the line 4—4 of FIG. 2, on a larger scale.
FIG. 5 is a corresponding size section on the line 5—5 of FIG. 1, showing the folder closed and how the envelope cooperates to keep the folder closed.
FIG. 6 is a horizontal section on the line 6—6 of FIG. 4, without the record.
FIG. 7 is a similar section illustrating a modification for two records.

Referring to FIGS. 1 to 6, the phonograph record folder of my invention is indicated generally by the reference numeral 10, and is shown in FIG. 1 as slidable into and out of a plastic protective envelope 11 with its hinges 12, 13 and 14 on lines parallel to the direction of movement relative to said envelope, so that the open side 15 is covered by the envelope for best protection of the record 16 against sliding out, and the best advantage is taken of the envelope to keep the folder from opening accidentally.

The cover or outer body 17 of the folder is made of cardboard or other similar material, each of the two side panels thereof being made of two sections 18 and 19 hingedly connected by a tape hinge 13, the lower sections 18 forming a supporting base for the folder when it is opened, as shown in FIGS. 3 and 4, and the upper sections 19 serving as braces for the opposite sides of the folder, so that the record 16 stands upright and may be grasped nicely at diametrically opposite points of the edge thereof by the finger tips, as indicated at 20 in FIG. 2. The record 16 is entered in an envelope 21 made of paper or other suitable material in two telescoping sections, the outer section 22 being the equivalent of a half envelope with a closed bottom 23 and being hingedly connected at the bottom by tape hinges 12 with the lower sections 18 of the unfoldable side members of the cover, while the inner section 23 is in the form of a sleeve open at the top and bottom and slidable inside the lower section 22 and hingedly connected at its upper end by tape hinges 14 with the upper sections 19 of the sides of the cover. The phonograph record 16 fits fairly closely but slidably in the inner section 23.

In operation, the phonograph record folder 10 is removed from the protective envelope 11 in the manner indicated in FIG. 1 and is placed on a flat surface as at 24 in FIG. 3, open end 15 up, and the upper sections 19 of the sides are moved downwardly, each with one hand, to bring the lower sections 18 into coplanar relationship resting on the surface 24 as a base for support of the folder in its opened condition, when the upper sections 19 by reason of their hinged connection with the upper end of the inner section 23 of the envelope 21 serve as braces on the opposite sides of the phonograph record 16 to hold the record in the upright position shown in FIGS. 2, 3, and 4, with the upper half nicely exposed so that one may readily remove the record, picking it up between the finger tips at the diametrically opposed points, as indicated at 20 in FIG. 2, so that there will be no finger prints on the record to spoil a Hi-Fi reproduction. The extent of amplification obtained with Hi-Fi equipment now-a-days is such that even a small finger print can spoil an otherwise good reproduction. The folder can be left standing until the operator is ready to replace the record in it, being careful again to handle the record only at the very edges. The unfolded sides of the folder fold inwardly as the folder is closed on the record, when the inner section 23 of the envelope 21 slides upwardly over the upper half of the record, and then the folder in its closed flat condition can be replaced in the protective envelope 11 again, as shown in FIG. 1.

The invention is not limited to folders for single records, because as shown at 10' in FIG. 7, it is a simple matter to provide one or more partitions 25 in the upper inner section 23' of the envelope 21' to house two, three, or more records in one folder. These partitions 25 cover approximately half of the records in the open and closed positions of the folder, the lower half in open position, and the upper half in closed position.

It is believed the foregoing description conveys a good understanding of the objects and advantages of my invention. The appended claims have been drawn to cover all legitimate modifications and adaptations.

I claim:

1. In a phonograph record folder of the "pop-up" type, an envelope to contain the circular disk record, said envelope comprising a lower rectangular envelope section having an open top and a closed bottom, and an upper rectangular envelope section having an open top and bottom and disposed in telescoping relation with the aforesaid lower section, and a protective cover formed by two rectangular side panels disposed on opposite sides of the envelope, each consisting of rectangular upper and lower sections hingedly connected along a line parallel to the bottom of the lower envelope section to unfold outwardly relative to the side of the envelope, the lower sections being hingedly connected at their lower edge portions with the bottom portion of the lower envelope section, and the upper sections being hingedly connected at their upper edge portions with the upper portion of the upper envelope section, the side panels of the cover being adapted to be folded into parallel relationship to one another on opposite sides of the envelope, and to be unfolded so that the lower sections of the cover are disposed in substantially coplanar relationship in a horizontal plane substantially at right angles to the vertical plane of the envelope while the upper sections of the cover are disposed in upwardly converging relationship to one another on opposite sides of the envelope to support it in upright position so as to support a record in upright position with its upper half exposed for grasping at its edges between finger tips of two hands engaged at diametrically opposed points on the record.

2. A phonograph record folder, as set forth in claim 1, wherein at least one of the telescoping envelope sections is partitioned to accommodate a plurality of circular disk records in closely spaced parallel concentric relationship.

3. A phonograph record folder as set forth in claim 1, wherein the upper envelope section fits inside the lower envelope section and is partitioned to accommodate a plurality of circular disk records in closely spaced parallel concentric relationship.

4. In combination with a phonograph record folder as set forth in claim 1, a rectangular protective outer envelope of a size to accommodate the folder with a record therein with a fairly close fit, so that said envelope prevents unfolding outwardly of the side panels of the cover when the folder is placed therein.

5. In combination with a phonograph record folder as set forth in claim 1, a rectangular protective outer envelope of a size to accommodate the folder with a record therein with a fairly close fit, so that said envelope prevents unfolding outwardly of the side panels of the cover when the folder is placed therein, the folder being inserted in the envelope with the hinges parallel to the side edges of the envelope, so as to close the open upper end of the upper envelope section in the folder and retain a record against outward displacement from the folder.

6. A phonograph record folder as set forth in claim 1 including means for preventing unfolding outwardly of the side panels of the cover relative to the two sections of the envelope.

7. A phonograph record folder as set forth in claim 1 including a single means retaining a record against outward displacement from the folder and preventing unfolding outwardly of the side panels of the cover relative to the two sections of the envelope.

References Cited in the file of this patent

UNITED STATES PATENTS

| | | |
|---|---|---|
| 2,142,826 | Rosello | Jan. 3, 1939 |
| 2,500,773 | Robins | Mar. 14, 1950 |
| 2,669,350 | Railton | Feb. 16, 1954 |